US006402335B1

(12) United States Patent
Kalantar et al.

(10) Patent No.: US 6,402,335 B1
(45) Date of Patent: Jun. 11, 2002

(54) LIGHT GUIDE PANEL AND PLANE ILLUMINATOR APPARATUS

(75) Inventors: Kalil Kalantar; Tadaaki Nakane, both of Tama (JP)

(73) Assignee: Nippon Leiz Corporation, Tokyo (JP)

( * ) Notice: Subject to any disclaimer, the term of this patent is extended or adjusted under 35 U.S.C. 154(b) by 0 days.

(21) Appl. No.: 09/657,287

(22) Filed: Sep. 7, 2000

(30) Foreign Application Priority Data

Sep. 13, 1999 (JP) ............................................ 11-259233

(51) Int. Cl.[7] ................................................. F21V 7/04
(52) U.S. Cl. .............................. 362/31; 362/26; 362/27; 362/560; 362/339; 362/223
(58) Field of Search .............................. 362/31, 26, 27, 362/560, 330, 335, 339, 223, 559; 349/62, 64, 65

(56) References Cited

U.S. PATENT DOCUMENTS

| 3,043,947 | A | | 7/1962 | Albinger, Jr. |
| 5,349,503 | A | | 9/1994 | Blonder et al. |
| 5,816,677 | A | * | 10/1998 | Kurematsu et al. ........... 362/26 |
| 5,914,759 | A | * | 6/1999 | Higuchi et al. ............... 349/57 |

FOREIGN PATENT DOCUMENTS

| JP | 3-6525 | 3/1998 |
| JP | 10123517 A | 5/1998 |
| TW | 368081 | 8/1998 |
| WO | WO98/40664 | 10/1998 |

* cited by examiner

*Primary Examiner*—Sandra O'Shea
*Assistant Examiner*—Bertrand Zeade
(74) *Attorney, Agent, or Firm*—Workman, Nydegger & Seeley

(57) ABSTRACT

A light guide panel according to the present invention includes at least one set of mutually opposing incident end surface portions through which light from light sources is introduced, a front surface portion through which light introduced from the set of the incident end surface portions is emanated, a back surface portion positioned on the opposite side to the front surface portion, and many light deflection portions formed on at least one between the front surface portion and the back surface portion. The rate of the light deflection portion per unit area along the other incident end surface portion from the one incident end surface portion is set to be two Gaussian distributions, and the peak of the first Gaussian distribution is biased to the side of the one incident end surface portion, and the peak of the second Gaussian distribution is biased to the side of the other incident end surface portion. Thereby, the amount of light emanating from the center of the light guide panel is relatively increased, and distribution of the amount of light emanating from all the front surface portion of the light guide panel can be made uniform.

21 Claims, 5 Drawing Sheets

LIGHT GUIDE PANEL AND PLANE ILLUMINATOR APPARATUS

This application is based on U.S. patent application Ser. No. 11-259233 (1999) filed Sep. 13, 1999, the content of which is incorporated hereinto by reference.

BACKGROUND OF THE INVENTION

1. Field of the Invention

The present invention relates to a light guide panel for uniformly emanating light introduced from a side end surface uniformly from a front surface, and a plane illuminator apparatus using the light guide panel, which illumination apparatus is suitable as a backlight source for a large-sized transmission type liquid crystal display.

2. Description of the Prior art

A plane illuminator apparatus for use in a backlight source for a transmission type liquid crystal display includes a light source such as a cathode-ray fluorescent luminescence tube (CFL), an LED array and the like, and a transparent light guide panel. Light emanated from the light source is guided from one end side of the light guide panel. The light incident in the light guide panel emanates finally uniformly from a front surface portion of the light guide panel or from all of a back surface portion utilizing total reflection of the light. The aforementioned plane illuminator apparatus generally has a diagonal line length of about 356 mm (14 inches) or less corresponding to the size of the transmission liquid crystal display.

Since in the prior art light guide panel and the plane illuminator apparatus light introduced from a one end side of the light guide panel thereinto, the amount of light emanated from the front surface portion of the light guide panel or the back surface portion has a tendency of attenuating as the light goes away from the one end side. For the purpose of emanating light uniformly from the entire region of the front surface portion of the light guide panel, there is formed a light deflection portion possessing finer unevenness for deflecting light propagating in the light guide panel to the outside of the light guide panel on the front surface portion of the light guide panel and/or on the back surface portion of the same. The rate of the distribution of the light deflection portion is set such that it is increased as it goes away from the one end of the light guide panel, through which the light emanated from the light source is introduced.

FIGS. 6 and 7 illustrate a relationship between a position of the one end side of the light guide panel from a light incident end surface and an area of the light deflection portion occupying per unit area, i.e., an occupation rate. FIG. 7 illustrates a situation where owing to reflected light from the other end surface of the light guide panel located in opposition to the incident end surface the amount of the light emanated from the neighborhood of the other end surface is likely to be increased, so that more uniform light emission is ensured than that illustrated in FIG. 6 by decreasing an occupation rate of the light deflection portion in the vicinity of the other end surface.

In recent years, in a large-sized transmission liquid crystal display having a diagonal line length exceeding 381 mm (15 inches) which can be manufactured, there are disposed a set of light sources on opposite ends of the light guide panel in opposition to each other such that a uniform distribution light amount emanates from a front surface portion of the display and simultaneously an enough illumination light amount is ensured. Herein, the distribution of the light deflection portion formed on the light guide panel is fundamentally designed such that the distribution of the light deflection portion illustrated in FIGS. 6 and 7 is symmetrical on the opposite sides of the light guide panel, more specifically there is increased the occupation rate of the light deflection as it lies more closely to the one set of the light sources with respect to the center of the light guide panel.

In such a light guide panel, the amount of the light emanated from the neighborhoods of the opposite end sides of the light guide panel is not only relatively increased but also the distribution of the amount of the light emanated from the entire region of the front surface portion of the light guide panel becomes uneven. Particularly, in a light guide panel set such that an occupation rate of the light deflection portion is more increased as it goes toward the one set of the light source side with respect to the center, the amount of the light emanated from the front surface portion of the light guide panel in the vicinity of the opposite end sides is sharply increased. As a result, it is unlikely to uniformize brightness distribution of the liquid crystal display. Moreover, visibility is deteriorated owing to uneven brightness.

Although in the light guide panel where the occupation rate is reduced of the light deflection portion located on the opposite sides of the light guide panel and in close vicinity of the one set of the light source based upon the distribution state of FIG. 7, such inconvenience is reduced, it fails to ensure a substantially uniform brightness distribution of the liquid crystal display and hence it is difficult to ensure excellent visibility.

SUMMARY OF THE INVENTION

It is accordingly an object of the present invention to provide, in a plane illuminator apparatus in which at least one set of light sources are employed to permit light to be incident from both opposite end sides of the light guide panel, a light guide panel capable of uniformizing distribution of an emanated light amount from a front surface of the light guide panel and the plane illuminator apparatus employing the foregoing light guide panel.

In a first aspect of the present invention, a light guide panel comprises at least one set of opposing incidence end surface portions into each of which light from a light source is introduced, a front surface portion from which the light introduced from the set of the incident end surface portions is emanated, a back surface portion located on the opposite side to the front surface portion, and many light deflection portions formed on at least one between the front surface portion and the back surface portion. The rate of the light deflection portion per unit area located along the one incident end surface portion from the other incident end surface portion is set to be two Gauss distributions, and a peak of the first Gauss distribution is shifted on the side of the one incident end surface portion while a peak of the second Gauss distribution is shifted to the side of the other incident end surface portion.

In accordance with the present invention, the rate of the light deflection portion per unit area extending from a one incident end surface portion along the other incident end surface portion is set to be two Gaussian distributions, and a peak of the first Gaussian distribution is displaced on the side of the one incident end surface portion while a peak of the second Gaussian distribution is biased on the side of the other incident end surface portion, so that substantially no light deflection portion is existent in the vicinity of each incident end surface portion. The amount of the emanated light from the front surface portion of the light guide panel substantially depends upon a distance from the incident end surface portion and the Gaussian distributions of the light deflection portion. This enables the light to be uniformly emitted from the front surface portion of the light guide panel without being influenced by the size of the light guide panel. Further, uniform brightness distribution corresponding to the brightness of the light source is ensured.

In the light guide panel according to the first aspect of the present invention, the peak of the first Gaussian distribution may be more biased to the center of the light guide panel extending from the one incident end surface portion to the other incident end surface portion rather than the side of the one incident end surface portion while the peak of the second Gaussian distribution may be more biased to the center of the light guide panel extending from the one incident end surface portion to the other incident end surface portion rather than the side of the other incident end surface portion. Since the peaks of the two Gaussian distributions are hereby located in close vicinity of the center of the light guide panel, even if there is employed a large-sized light guide panel having a long distance from the one incident surface portion to the other incident end surface portion, the light is successfully uniformly emanated from the front surface portion. Further, there is ensured uniform brightness distribution corresponding to the brightness of the light source.

Herein, the other incident end surface portion side with the first Gaussian distribution and the one incident end surface portion side with the second Gaussian distribution are set to be prevented from being averaged, and the light deflection portion having a directivity is employed, whereby even if the size of the light guide panel is very large, the light can be uniformly emanated from the front surface portion. Additionally, there is ensured uniform brightness distribution corresponding to the brightness of the light source.

The light deflection portion is configured as an isosceles triangle when projected perpendicularly to the front surface portion, and has a pair of vertical conical surfaces rising substantially vertically from the front surface portion and an inclined conical surface inclined with respect to the front surface portion such that a bottom side is parallel to the incident end surface portion. Otherwise, the light deflection portion may be an indentation constructed as a part of a spherical surface with a predetermined radius of curvature in the back surface portion.

When the light guide panel is rectangular plate shaped, two sets of incident end surface portions opposing to each other may be provided. Herein, the two sets of the incident end surface portions intersect each other in their opposing direction to ensure bright illumination light.

In a second aspect of the present invention, a plane illuminator apparatus comprises a light guide panel including a front surface portion from which light emanates, a back surface portion located on the opposite side of the front surface portion, and at least a set of opposing incident end surface portions putting these front surface portion and back surface portion, a set of light sources for projecting toward the set of the incident end surface portions of the light guide panel respectively, and a light reflection sheet for covering portions other than the front surface portion of the light guide panel and the set of the incident end surface portions. The rate of the light deflection portions per unit area extending along the one incident end surface portion from the other incident end surface portion is set to be two Gaussian distributions, and the peak of the first Gaussian distribution is biased to the side of said one incident end surface while the peak of the second Gaussian distribution is biased to the side of the other incident end surface portion.

In the plane illuminator apparatus according to the second aspect of the present invention, the peak of the first Gaussian distribution may be more biased to the center of the light guide panel extending from the one incident end surface portion to the other incident end surface portion rather than the side of the one incident end surface portion while the peak of the second Gaussian distribution may be more biased to the center of the light guide panel extending from the one incident end surface portion to the other incident end surface portion rather than the side of the other incident end surface portion. Since the peaks of the two Gaussian distributions are hereby located in close vicinity of the center of the light guide panel, even if there is employed a large-sized light guide panel having a long distance from the one incident surface portion to the other incident end surface portion, the light is successfully uniformly emanated from the front surface portion. Further, there is ensured uniform brightness distribution corresponding to the brightness of the light source.

Herein, the other incident end surface portion side with the first Gaussian distribution and the one incident end surface portion side with the second Gaussian distribution are set to be prevented from being averaged, and the light deflection portion having a directivity is employed, whereby even if the size of the light guide panel is very large, the light can be uniformly emanated from the front surface portion. Additionally, there is ensured uniform brightness distribution corresponding to the brightness of the light source.

The light deflection portion is configured as an isosceles triangle when projected perpendicularly to the front surface portion, and has a pair of vertical conical surfaces rising substantially vertically from the front surface portion and an inclined conical surface inclined with respect to the front surface portion such that a bottom side is parallel to the incident end surface portion. Otherwise, the light deflection portion may be an indentation constructed as a part of a spherical surface with a predetermined radius of curvature in the back surface portion.

When the light guide panel is rectangular plate shaped, two sets of incident end surface portions opposing to each other may be provided. Herein, the two sets of the incident end surface portions intersect each other in their opposing direction to ensure bright illumination light.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

In what follows, there now will be described an embodiment where the present invention is applied to a backlight of a transmission type liquid crystal display with reference to FIGS. 1 to 5. The present Invention is not limited to such embodiments, and is applicable to these embodiments and to other techniques to be included in the idea of the present invention defined in claims in the present application.

Figure 1:
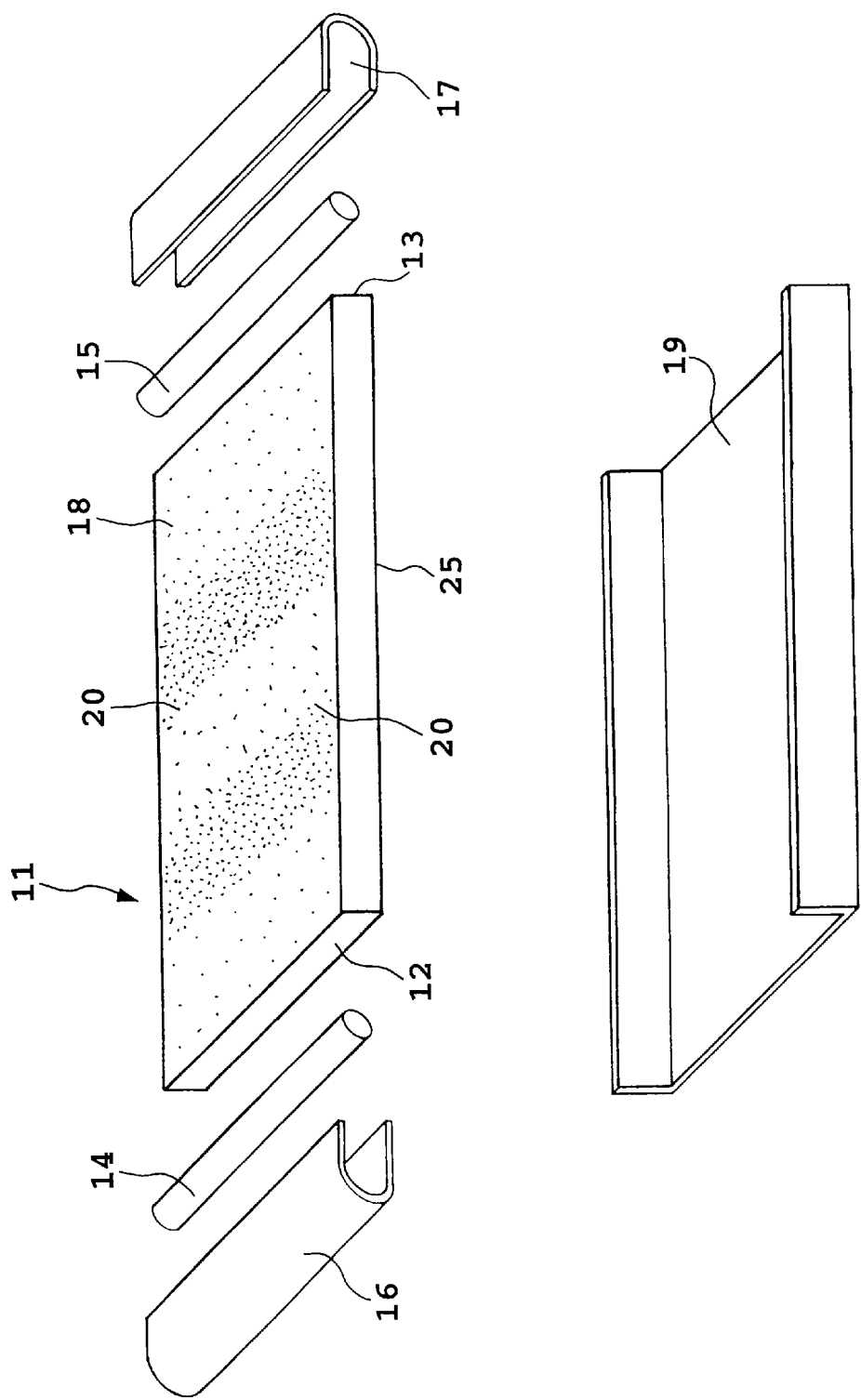
FIG. 1 is a decomposed perspective view of a plane illuminator apparatus in an embodiment of the present invention.

A plane illuminator apparatus in the present embodiment is illustrated, decomposed, in FIG. 1. More specifically, a plane illuminator apparatus in the present embodiment includes a rectangular plate shaped light guide panel 11, a set of linear light sources 14, 15 for introducing illumination light from a set of mutually opposing incident end surface portions 12, 13 of the light guide panel 11, a set of reflectors 16, 17 surrounding respectively these light sources 14, 15, and a light reflection sheet 19 for covering portions of the light guide panel 11 other than the incident end surface portions 12, 13 of the light guide panel 11 and the front surface portion 18 of the same.

The light guide panel 11 in the present embodiment is formed with transparent acrylic resin (PMMA) and polycarbonate (PC) both having about 1.4 to 1.7 refractive index. Innumerable light deflection portions 20 are provided, protruded on the front surface portion 18 for emanating light propagating in the light guide panel 11 from the front surface portion 18.

The light sources 14, 15 in the present embodiment consist of a CCFL (Cold Cathode Fluorescent Lump), etc., and are connected with a power supply (not illustrated). The reflectors 16, 17 surrounding the light sources 14, 15 are formed with a white colored insulating material, a sheet on which metal such as aluminum is vacuum evaporated, or a metal plate, etc., and have a function of reflecting light from the light sources 14, 15 and forcing the reflected light to impinge on the incident end surface portions 12, 13 of the light guide panel 11.

The light reflection sheet 19 in the present embodiment is formed with a mixture where a white colored material such as titanium oxide is mixed into thermoplastic resin, one where metal such as aluminum is vacuum evaporated on a thermoplastic resin sheet, one where a metal foil is laminated, and further a sheet metal. The sheet 19 reflects or randomly reflects the light emanated from a portion of the light guide panel 11 excepting the incident end surface portions 12, 13 and the front surface portion 18, and forces again the emanated light to impinge in the light guide panel 11, and finally forces all light from the light sources 14, 15 to emanate to the outside from the front surface portion 18.

Figure 2:
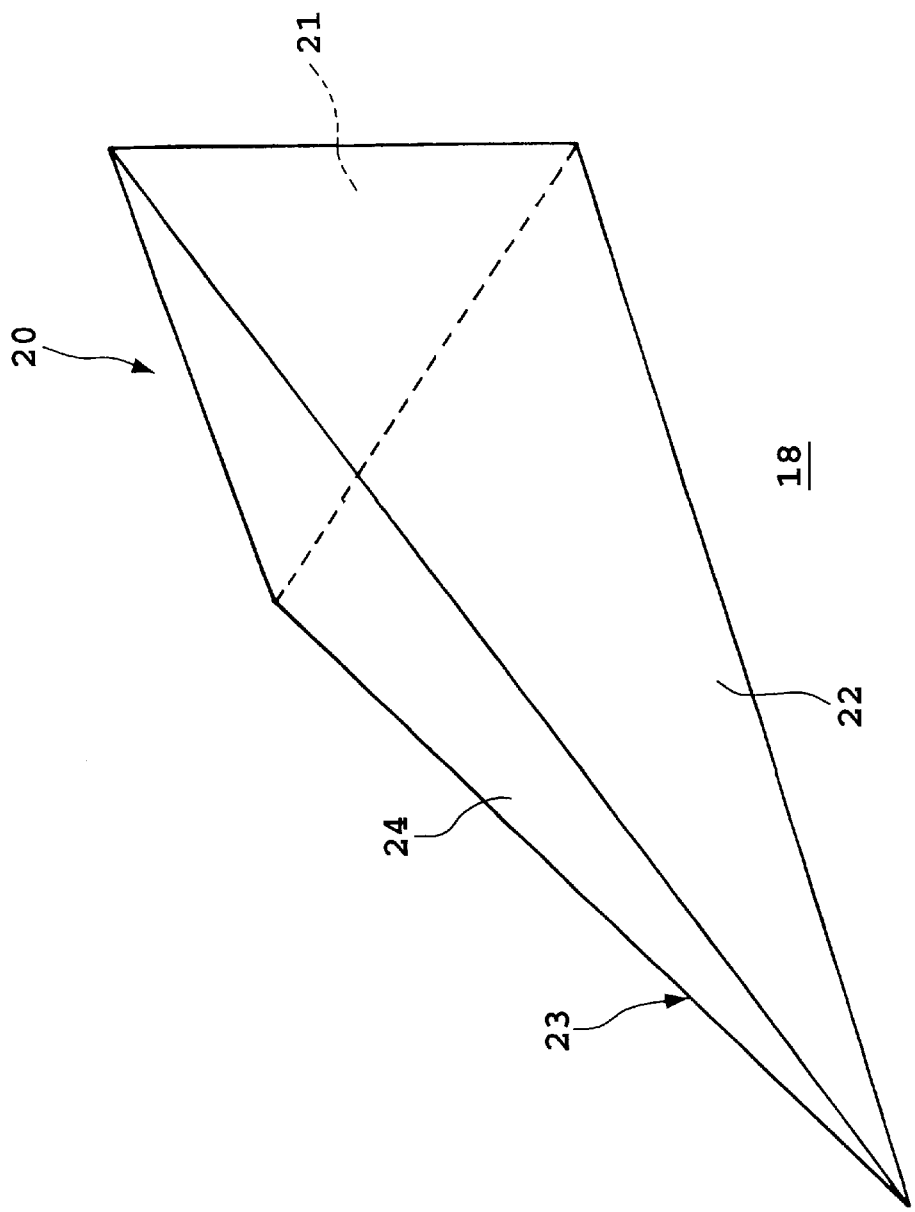
FIG. 2 is a perspective view illustrating an external view of a light deflection portion in the embodiment illustrated in FIG. 1.

An external appearance of the light deflection portion 20 is illustrated, expanded, in FIG. 2. The light deflection portion 20 in the present embodiment presents a contour configuration of an isosceles triangle as projected perpendicularly to the front surface portion 18, and includes a pair of vertical conical surfaces 21, 22 rising substantially vertically from the front surface portion 18 and an inclined conical surface 24 inclined with respect to the front surface portion 18 such that a bottom side 23 is parallel to the incident end surface portions 12, 13. There are two types for the inclined conical surface 24: one directed toward the side of the one incident end surface portion 12 and the other one directed toward the side of the other incident end surface portion 13.

The light incident in the light guide panel 11 from the incident end surface portions 12, 13 propagates in the light guide panel 11 at a refraction angle $\gamma$ (e.g., $0°\sim\pm42°$) satisfying $0\leq\gamma\leq\sin^{-1}(1/n)$. Particularly, once the light enters the light deflection portion 20 substantially at a critical angle, a part thereof emanates to the outside of the light guide panel 11 from the vertical conical surfaces 21, 22 with refraction. More specifically, the light deflection portion 20 has a function of emanating the part of the light propagating in the light guide panel 11 to the outside of the front surface portion 18. Accordingly, emanation of the light from the front surface portion 18 can be altered by adjusting the distribution of the light deflection portion 20.

Figure 3:
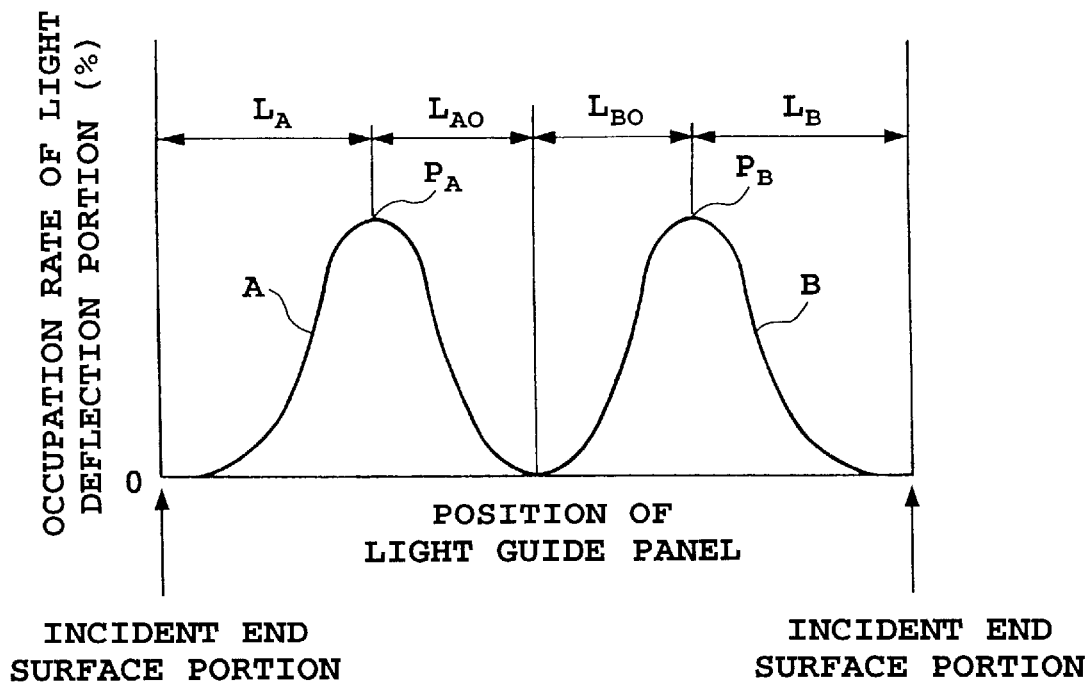
FIG. 3 is a graphical representation illustrating a distribution state of the light deflection portion in the embodiment in FIG. 1.

FIG. 3 illustrates a relationship between a position of the front surface portion 18 of the light guide panel 11 extending from the one incident end surface portion 12 and the rate of the sum of the areas of the light deflection portion 20 per unit area (projection area when projected perpendicularly to the front surface portion 18) (hereinafter, referred to as an occupation rate of the light deflection portion 20). More specifically, in the present embodiment the light deflection portion 20 where the inclined conical surface 24 is directed to the side of the one incident end surface portion 12 is set to be a Gaussian distribution A, while the light deflection portion 20 where the inclined conical surface 24 is directed to the side of the other incident end surface portion 13 is set to be a Gaussian distribution B. The peaks $P_A$ and $P_B$ of the two Gaussian distributions are set to be occupation rates of 2% to 10%, and hence these two Gaussian distributions are connected with each other at the center of the light guide panel 11 without being overlapped.

In the present embodiment, a distance $L_A$ from the one incident end surface portion 12 to the peak $P_A$ of the one Gaussian distribution A located in the vicinity of the incident end surface portion 12 and a distance $L_B$ from the other incident end surface portion 13 to the peak $P_B$ of the other Gaussian distribution B located in the vicinity of the incident end surface portion 13 are set longer than distances $L_{AO}$, $L_{BO}$ from these peaks $P_A$, $P_B$ to the center of the light guide panel 11. The peaks $P_A$, $P_B$ of the two Gaussian distributions A, B are biased to the side of the center of the light guide panel 11. In the present embodiment $L_A=L_B$ and $L_{AO}=L_{BO}$.

In the present embodiment the occupation rate of the light deflection portion 20 at the center of the light guide panel 11 is 0%. However, as illustrated in FIG. 2, since the configuration of the light deflection portion 20 is set to be two types of triangular cones, it is possible to direct the emanation of the light from the light deflection portion 20 as described above. To be concrete, the emanation of light is directed to the side of the center of the light guide panel 11, so that the emanation light amount from the front surface portion 18 is successful in substantially being made uniform substantially over the entire region of the front surface portion 18 of the light guide panel 11.

It is preferable that in response to the configuration of the light deflection portion 20, i.e., deflection characteristics of the light the positions of the peaks $P_A$, $P_B$ of the two Gaussian distributions A, B are adjusted, and the emanation light amount from the front surface portion 18 is substantially uniformized over the entire region of the front surface portion 18 of the light guide panel 11. From this point of view the Gaussian distributions are not needed to be a normal distribution. It is further possible parts of the two Gaussian distributions are overlapped each other. Further, although in the aforementioned embodiment the light deflection portion 20 is formed only on the side of the front surface portion 18, the light deflection portion 20 may be formed only on the side of the back surface portion 25 provided oppositely to the light deflection portion. Alternately, the light deflection portion 20 can be formed on the front surface portion 18 and the back surface portion 25. Further, instead of the triangular cone shaped light deflection portion 20 another arbitrary configuration light deflection portion 20 is useable.

Figure 4:
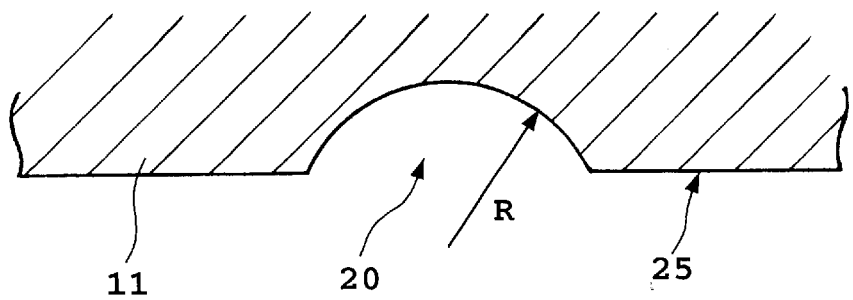
FIG. 4 is a cross section of a light guide panel illustrating another embodiment of the light deflection portion according to the present invention.
Figure 5:
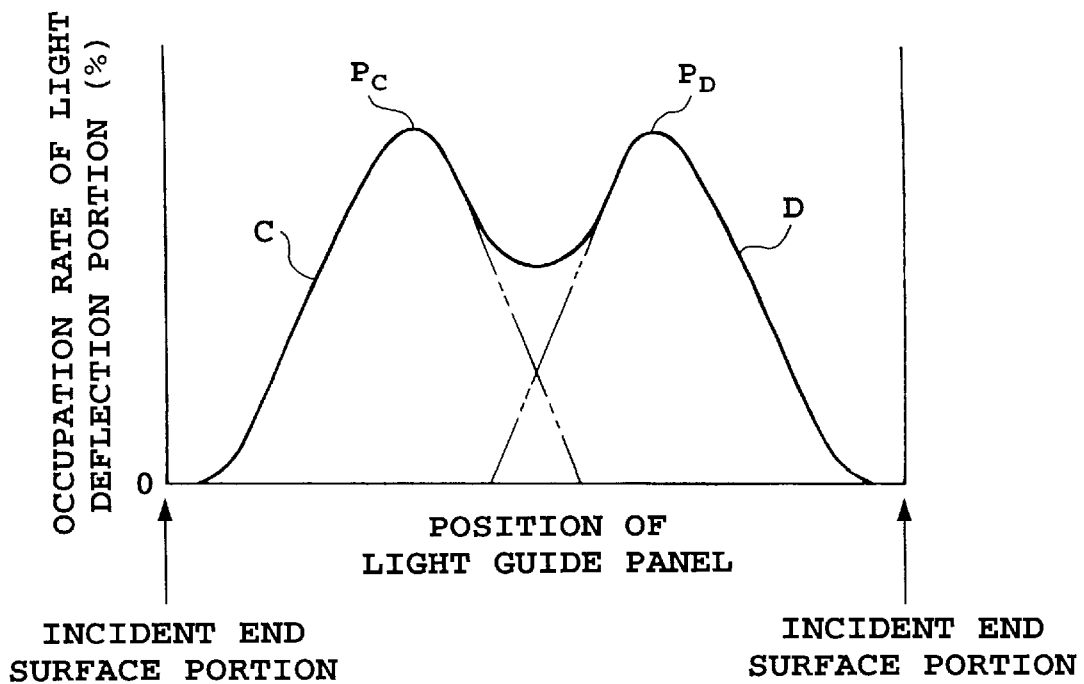
FIG. 5 is a graphical representation illustrating another example of a distribution state of the light deflection portion in the light guide panel of the present invention.
Figure 6:
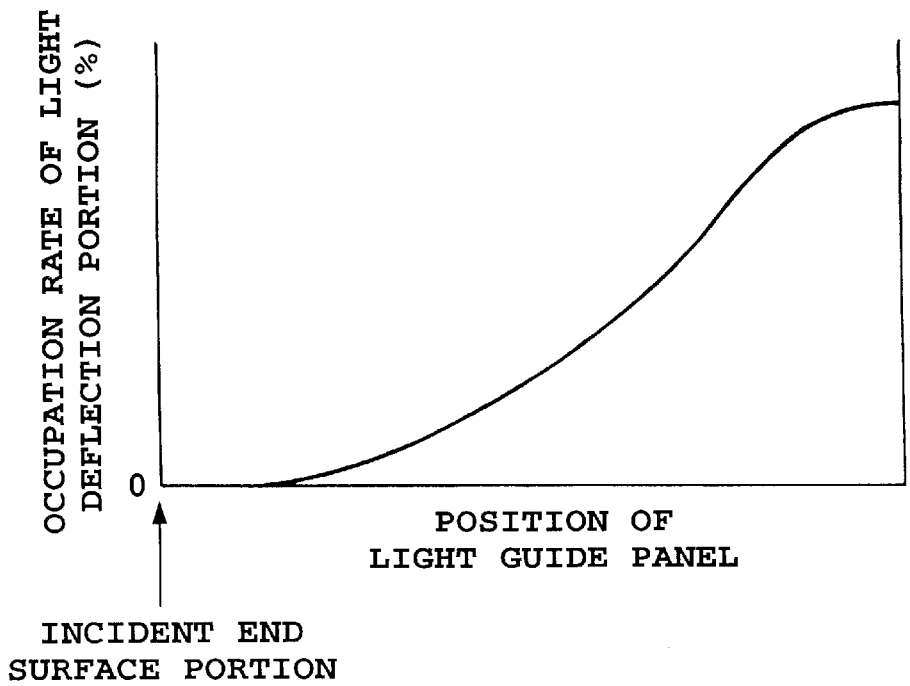
FIG. 6 is a graphical representation illustrating an example of a distribution state of a light deflection portion in a prior art light guide panel.
Figure 7:
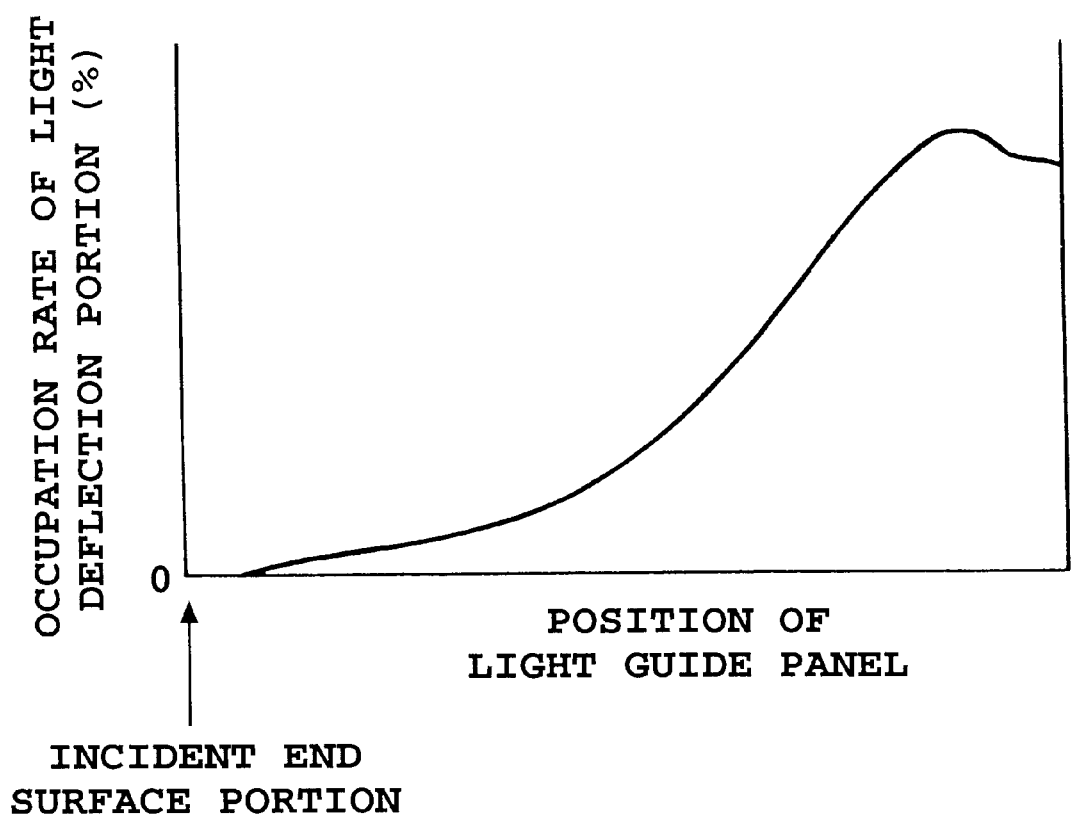
FIG. 7 is a graphical representation illustrating another example of a distribution state of the light deflection portion in the light guide panel according to prior art.

FIG. 4 illustrates a cross-sectional structure of another embodiment of the light guide panel 11 according to the present invention on the side of the back surface portion 25. In FIG. 4, to portions with the same functions as those of the aforementioned embodiment same symbols shall be applied, and overlapped description will be neglected. More specifically, the light deflection portion 20 in the present embodiment is constructed as an indentation due to a part of a spherical surface of a predetermined radius of curvature R, and its occupation rate with respect to the back surface portion 25 is set to be such two Gaussian distributions C, D as illustrated in FIG. 5. In the present embodiment, the two Gaussian distributions C, D are not normal distributions, but are synthesized state distributions where these Gaussian distributions are partly overlapped at the center of the light guide panel 11 possessing such two peaks $P_C$, $P_D$ as illustrated by a solid line in FIG. 5. Likewise the previous embodiment, also in the present embodiment, it is possible to make uniform the brightness distribution of light emanating from the front surface portion 18.

Although in the aforementioned embodiments, illumination light is forced to enter from the set of the light sources 14, 15 through the set of the incident end surface portions 12, 13 of the light guide panel 11, when the size of the rectangular plate shaped light guide panel 11 is larger, a set of opposing side end surfaces opposing in the direction intersecting the opposing direction of these incident end surface portions 12, 13 are employed as the incident end surface portion, and a set of light sources is further disposed along the incident end surface portions, whereby further brighter illumination light is ensured. Also in this case, it is necessary to set the rate of the light deflection portions as two Gaussian distributions along the opposing direction of each set of the incident end surface portions. In this case, peaks of four Gaussian distributions appear at the center of the light guide panel.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A light guide panel comprising:
   at least one set of opposing incident end surface portions adapted to receive light from a light source;
   a front surface portion from which the light when introduced from the set of incident end surface portions is emanated;
   a back surface portion located on the opposite side to the front surface portion; and
   a plurality of light deflection portions formed on at least one of the front surface portion or the back surface portion, the light deflection portions being configured to refract light when light passes therethrough,
   wherein the concentration of said light deflection portions per unit area along the at least one of the front surface portion or back surface portion comprises a first Gauss distribution and a second Gauss distribution, and a peak of said first Gauss distribution is shifted toward one incident end surface portion while a peak of said second Gauss distribution is shifted toward the other incident end surface portion.

2. The light guide panel as claimed in claim 1 wherein said peak of said first Gauss distribution is more shifted toward the center of said light guide panel than toward the incident end surface portion.

3. The light guide panel as claimed in claim 1 wherein the first and second Gauss distributions are not overlapped in the center of the light guide panel.

4. The light guide panel as claimed in claim 1 wherein each of said light deflection portions includes a pair of vertical pyramids conical surfaces having a contour configuration of an isosceles triangle projected perpendicularly and rising substantially vertically from said front surface portion or said back surface portion, and an inclined conical surface inclined with respect to said front surface portion or said back surface portion such that a bottom side is parallel to said incident end surface portions.

5. The light guide panel as claimed in claim 1 wherein each of said light deflection portions is an indention formed as a part of a spherical surface with a predetermined radius of curvature in said back surface portion.

6. The light guide panel as claimed in claim 1 wherein said light guide panel is rectangular plate shaped, and there are provided two sets of mutually opposing incident end surface portions.

7. The light guide panel as claimed in claim 6 wherein said sets of the incident end surface portions intersect to each other in their opposing directions.

8. A plane illuminator apparatus comprising:
   a light guide panel including a front surface portion configured to emanate light, a back surface portion located on the opposite side of the front surface portion, at least a set of opposing incident end surface portions, and a plurality of light deflection portions located on at least one of the front surface portion or the back surface portion, the light deflection portions being configured to refract light when light passes therethrough;
   light sources for projecting light toward the at least a set of opposing incident end surface portions of the light guide panel; and
   a light reflection sheet covering at least a portion of the back surface portion of the light guide panel,
   wherein the concentration of said light deflection portions per unit area along the at least one of the front surface portion or the back surface portion comprises a first Gauss distribution and a second Gauss distribution, and the peak of said first Gauss distribution is shifted toward one incident end surface while the peak of said second Gauss distribution is shifted toward the other incident end surface portion.

9. The plane illuminator apparatus as claimed in claim 8 wherein said peak of said first Gauss distribution is more shifted toward the center of said light guide panel than toward the incident end surface portion.

10. The plane illuminator apparatus as claimed in claim 8 wherein the first and second Gauss distributions are not overlapped in the center of the light guide panel.

11. The plane illuminator apparatus as claimed in claim 8 wherein each of said plurality of light deflection portions includes a pair of vertical pyramids conical surfaces having a contour configuration of an isosceles triangle projected perpendicularly and rising substantially vertically from said front surface portion or said back surface portion, and an inclined conical surface inclined with respect to said front surface portion or said back surface portion such that a bottom side is parallel to said incident end surface portion.

12. The plane illuminator apparatus as claimed in claim 8 wherein each of the plurality of light deflection portions comprises an indention formed as a part of a spherical surface with a predetermined radius of curvature in said back surface portion.

13. The plane illuminator apparatus as claimed in claim 8 wherein said light guide panel is rectangular plate shaped, and there are provided two sets of mutually opposing incident end surface portions.

14. The plane illuminator apparatus as claimed in claim 13 wherein said sets of the incident end surface portions intersect to each other in their opposing directions.

15. A light guide panel adapted to receive light from a light, the light guide panel comprising:

a front surface, an opposing back surface, and a first incident surface extending therebetween, the first incident surface being adapted to receive light such that the light emanates from the front surface portion; and a plurality of light deflection portions positioned on at least one of the front surface or the back surface, the light deflection portions being configured to refract light when light passes therethrough, wherein the concentration of the light deflection portions per unit area along the at least one front surface or back surface comprises at least one substantially Gauss distribution.

16. The light guide panel as recited in claim 15 wherein each of the plurality of light deflection portions has a pyramidal configuration comprising:

a pair of vertical surfaces, each having a configuration of an isosceles triangle, the pair of vertical surfaces projecting substantially perpendicularly from the front face or the back face; and an inclined surface extending between the pair of vertical surfaces, the inclined surface having a top portion and a bottom portion, wherein the inclined surface is inclined with respect to the front face or back face such that the bottom portion is parallel to the first incident surface.

17. The light guide panel as recited in claim 16 wherein the inclined surface faces toward the first incident surface.

18. The light guide panel as recited in claim 16 wherein the inclined surface faces away from the first incident surface.

19. The light guide panel as claimed in claim 15 wherein each of the plurality of light deflection portions comprises an indention formed in the back surface, the indention having a spherical surface with a predetermined radius of curvature.

20. The light guide panel as claimed in claim 15 further comprising a second incident surface extending between the front surface and the back surface.

21. The light guide panel as claimed in claim 20 wherein the concentration of the light deflection portions per unit area along the at least one front surface or back surface comprises a first and second substantially Gauss distribution, the first Gauss distribution having a first peak and the second Gauss distribution having a second peak, the first peak and second peak being separated.

* * * * *

UNITED STATES PATENT AND TRADEMARK OFFICE
CERTIFICATE OF CORRECTION

PATENT NO. : 6,402,335 B1  Page 1 of 1
DATED : June 11, 2002
INVENTOR(S) : Kalantar et al.

It is certified that error appears in the above-identified patent and that said Letters Patent is hereby corrected as shown below:

Column 1,
Line 53, change "surface" to -- surface, --

Column 2,
Line 3, change "panel, more" to -- panel. More --
Lines 3 and 4, change "specifically" to -- specifically, --

Column 5,
Line 13, change "Invention" to -- invention --
Lines 32-33, change "provided, protruded on" to -- provided protruding from --
Line 37, after "Fluorescent" change "Lump" to -- Lamp --

Column 6,
Line 57, change "emanation light amount" to -- amount of emanation light --
Line 58, change "substantially being made uniform substantially" to
-- being made substantially uniform --
Line 63, after "light" insert -- , --

Column 7,
Line 2, after "possible" insert -- that --
Line 3, change "are overlapped each other" to -- overlap each other --
Line 18, before "same" insert -- the --
Line 30, change "Likewise the" to -- Likewise, in the --
Line 37, change "panel 11, when" to -- panel 11. When --

Column 8,
Line 37, after "intersect" remove "to"

Signed and Sealed this

Twenty-fifth Day of May, 2004

JON W. DUDAS
*Acting Director of the United States Patent and Trademark Office*